UNITED STATES PATENT OFFICE.

FRANZ A. RODY, OF JOHNSON CITY, TENNESSEE, ASSIGNOR TO METALLURGICAL COMPANY OF AMERICA, OF NEW YORK, N. Y., A CORPORATION OF NEW JERSEY.

TREATMENT OF FELDSPAR, LEUCITE, AND THE LIKE.

1,285,796. Specification of Letters Patent. Patented Nov. 26, 1918.

No Drawing. Application filed May 18, 1915, Serial No. 28,889. Renewed July 20, 1918. Serial No. 245,966.

*To all whom it may concern:*

Be it known that I, FRANZ A. RODY, a subject of the Emperor of Germany, residing at Johnson City, in the county of Washington and State of Tennessee, have invented certain new and useful Improvements in the Treatment of Feldspar, Leucite, and the like; and I do hereby declare the following to be a full, clear, and exact description of the invention, such as will enable others skilled in the art to which it appertains to make and use the same.

In my prior Patent No. 1,151,533, granted August 24, 1915, I have described a method for the extraction of alkalis and alumina from silicates containing them (such as feldspar, leucite, etc.) by bringing to a sintering temperature a mixture containing the silicate together with an alkaline earth metal oxid or its equivalent in proportion to form an ortho-silicate of the alkaline earth metal and at the same time combining the alkali and alumina in water-soluble form as alkali aluminate.

My further researches on this subject have demonstrated that a certain approximate relation or ratio exists between the alumina and alkali in that portion which has been thus made water-soluble as alkali aluminate. This ratio varies somewhat but may be taken approximately as one molecule of alumina to 1.7 molecules of alkali present.

In addition to this, my researches have disclosed that the quantity of alumina contained in the natural silicates is usually greater than the quantity of alkali present, and that, therefore, the ratio of 1:1.7 is never realized, the actual ratio being much lower,—averaging 1:1, or less. This circumstance limits the amount of alumina that can be extracted from silicates by my method, for the reason that the amount of alkali present in the natural rock is insufficient to combine with all of the alumina to make it water-soluble.

I have been able to improve the extraction of alumina soluble in water as alkali aluminate, by increasing the quantity of alkali as found in the natural silicates. This may be accomplished, for instance, in either of the following ways:

(1). The requisite amount of alkali (such as potassium carbonate) is added to the finely crushed natural silicate (feldspar, leucite, etc.) in amount sufficient to make the ratio of alumina $(Al_2O_3)$ to total alkali as $K_2O = 1:1.7$. The mass is then heated until all the carbonic acid is driven off and the alkali has combined with the silica.

(2). Or, the required amount of alkali, as hydroxid, is added to the finely crushed silicate and digested therewith either under pressure or without pressure until the added alkali has combined with the silica.

In either case, the product of the operation is thereupon crushed and is then treated for the extraction and recovery of the alkali and alumina in the form of water-soluble alkali aluminate, in accordance with the method set forth in my Patent No. 1,151,533 hereinbefore referred to.

As hereinbefore indicated, the underlying discovery upon which the present invention is based, consists in the ascertainment of the fact that by increasing the amount of alkali present in feldspar, leucite, and similar natural silicates, the yield of water-soluble alumina from such silicates can be likewise increased. It will be apparent that the amount of alkali to be added to the natural rock is not necessarily to be limited to the establishment of the proportion hereinbefore given, but may vary therefrom somewhat to suit the material treated or to other conditions.

From the above description, it will be seen that the alkali compounds employed are basic alkali compounds and that they combine directly with the natural silicate, the combination requiring merely heating, in the case of the carbonate, and digestion, in the case of the hydroxid.

What I claim is:

1. The method of recovering alkalis and alumina from feldspar, leucite and like rock silicates containing them, which comprises preliminarily treating the silicate rock with a basic alkali compound and thereby combining with the silicate rock an additional quantity of alkali beyond its natural content and bringing to a sintering temperature a mixture of said combined rock and additional alkali with an oxygen compound of an alkaline earth metal in proportion to form an ortho-silicate of the alkaline earth metal and at the same time combining the alkali and alumina in water-soluble form; substantially as described.

2. The method of recovering alkalis and alumina from feldspar, leucite and like rock silicates containing them, which comprises preliminarily treating the silicate rock with a basic alkali compound and thereby combining with the silicate rock an additional quantity of alkali beyond its natural content so as to establish therein a ratio of approximately 1 molecule of alumina to 1.7 molecules of alkali present and bringing to a sintering temperature a mixture of said combined rock and additional alkali with an oxygen compound of an alkaline earth metal in proportion to form an ortho-silicate of the alkaline earth metal and at the same time combining the alkali and alumina in water-soluble form.

3. The method of treating feldspar, leucite and like rock silicates containing alkalis and alumina, which comprises increasing the percentage of alkali therein by heating a mixture of the silicate and potassium carbonate and thereby expelling the carbon dioxid from the carbonates and combining the alkali and the silicate and bringing to a sintering temperature a mixture of said combined rock and additional alkali with an oxygen compound of an alkaline earth metal in proportion to form an ortho-silicate of the alkaline earth metal and at the same time combining the alkali and alumina in water-soluble form; substantially as described.

In testimony whereof I affix my signature, in presence of two witnesses.

FRANZ A. RODY.

Witnesses:
H. M. BURKEY,
JEROME S. KATZ.